R. DIESEL.
DRIVING OF MOTOR VEHICLES AND SIMILAR MOTOR PLANTS.
APPLICATION FILED SEPT. 19, 1910.
1,080,624.
Patented Dec. 9, 1913.
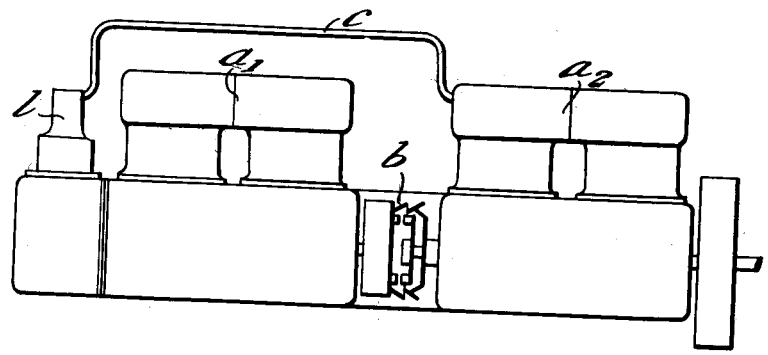
WITNESSES
INVENTOR

UNITED STATES PATENT OFFICE.

RUDOLF DIESEL, OF MUNICH, GERMANY, ASSIGNOR TO BUSCH-SULZER BROS.-DIESEL ENGINE COMPANY, OF ST. LOUIS, MISSOURI, A CORPORATION OF MISSOURI.

DRIVING OF MOTOR-VEHICLES AND SIMILAR MOTOR PLANTS.

1,080,624.      Specification of Letters Patent.      Patented Dec. 9, 1913.

Application filed September 19, 1910. Serial No. 582,653.

*To all whom it may concern:*

Be it known that I, RUDOLF DIESEL, a subject of the King of Bavaria, residing at 32 Maria-Theresia-strasse, Munich, in the Kingdom of Bavaria, Germany, have invented certain new and useful Improvements in the Driving of Motor-Vehicles and Similar Motor Plants, of which the following is a specification.

Compressed air has quite recently been put forward as a means for effecting the various auxiliary operations necessary in the driving of motor vehicles, such as for example the pumping up of the tires, the operation of the brakes and gearing, the coupling in a pneumatic manner, instead of mechanical means, and also the starting without the use of the starting handle and so on. The majority of proposed arrangements for attaining these purposes comprise an independent air pump which is connected to and disconnected from the main motor as required by the driver by means of clutches and lever mechanism; some of these arrangements have even had an auxiliary motor for the air pump which could be started and stopped as required.

The present invention proposes to use compressed air not only for the above mentioned purposes of the vehicle but also for the working of the motor itself, as for example by spraying the fuel or by increasing the pressure in the suction pipes of the motor, and otherwise. The former expedient makes it possible to use heavier and therefore cheaper fuel; the latter gives increased power for the same cylinder dimensions. By these means the operation of the engine is greatly improved and there is also a great simplification of the arrangement and less attention is required as compared with the above mentioned arrangement, because since compressed air is always required for the working of the motor itself, the air pump plant is connected directly with the motor, or even rigidly coupled therewith and always runs with the motor, whether the motor vehicle is moving or not; the undesirable coupling gear or the special motor for the air pump plant are thereby dispensed with and the attention of the driver is no longer diverted by these additional machines.

The accompanying drawing shows an eight cylinder motor divided into two groups, $a_1$ and $a_2$ of four cylinders each by a clutch $b$, the group $a_1$ being rigidly coupled with an air pump $l$. During the period of starting and acceleration of the vehicle this group $a_1$ together with the air pump $l$ are rotated very rapidly not being coupled up to the other group, in order to supply highly compressed air through pipe $c$ to the other group $a_2$, as for spraying in the fuel or increasing the pressure of the air admitted to the cylinders, or otherwise obtaining a high power development for the other group, which rotates slowly on starting, so obtaining a high starting moment without having to use a large reservoir for highly compressed air. As soon as the necessary velocity of the vehicle has been attained the clutch $b$ is inserted and both groups work together to drive the vehicle, the air pump still working. The same expedient can be used for steep hills where very large turning moments are necessary; in this case the group $a_1$ can be disconnected and made to run very rapidly by itself together with the air pump for the purpose of conveying compressed air to the slow running group $a_2$ so as to increase its power. The division of the cylinders into two groups may be other than four and four, as for example two and six, or even into one and seven, or in any other desired manner. Of course this method may be used for the working of the motor alone; whether and in how far the auxiliary operations necessary for driving the vehicle are effected by the compressed air is matter to be settled for each case.

The described arrangement is also applicable to other vehicles, for example ships, locomotives and also for such stationary purposes in which regulation and slow running as well as over-loading of the machine or other auxiliary compressed air operations have to be allowed for, as for example in conveying plants.

Having thus described the nature of my said invention and the best means I know of carrying the same into practical effect, I claim:—

In a power plant, in combination with a drive shaft, a divided internal combustion engine the parts of which are adapted to rotate the drive shaft by their combined impulses, a clutch for coupling and uncoupling the divisions of the engine, one part of the engine remaining connected to the drive shaft and the other part being disconnected from the shaft so as to run independently thereof when the clutch is uncoupled, an air pump permanently connected with the latter part, and means for supplying compressed air from said pump to the part which remains connected with the drive shaft.

In testimony whereof I have signed my name to this specification in the presence of two subscribing witnesses.

RUDOLF DIESEL. [L.S.]

Witnesses:
HENRY HASPER,
WOLDEMAR HAUPT.